United States Patent
Wallace

(10) Patent No.: US 11,698,503 B2
(45) Date of Patent: Jul. 11, 2023

(54) OPTICAL FIBER HOLDING DEVICE

(71) Applicant: Lumentum Operations LLC, San Jose, CA (US)

(72) Inventor: Patrick Wallace, Milipitas, CA (US)

(73) Assignee: Lumentum Operations LLC, San Jose, CA (US)

( * ) Notice: Subject to any disclaimer, the term of this patent is extended or adjusted under 35 U.S.C. 154(b) by 11 days.

(21) Appl. No.: 17/446,199

(22) Filed: Aug. 27, 2021

(65) Prior Publication Data

US 2021/0389541 A1   Dec. 16, 2021

Related U.S. Application Data

(62) Division of application No. 16/670,240, filed on Oct. 31, 2019, now Pat. No. 11,105,997.

(60) Provisional application No. 62/861,174, filed on Jun. 13, 2019.

(51) Int. Cl.
  *G02B 6/44* (2006.01)
  *G02B 6/42* (2006.01)

(52) U.S. Cl.
  CPC ......... *G02B 6/4478* (2013.01); *G02B 6/4453* (2013.01); *G02B 6/428* (2013.01)

(58) Field of Classification Search
  CPC ..... G02B 6/428; G02B 6/4453; G02B 6/4478
  See application file for complete search history.

(56) References Cited

U.S. PATENT DOCUMENTS

| | | |
|---|---|---|
| 5,796,908 A | 8/1998 | Vicory |
| 6,243,526 B1 | 6/2001 | Garibay et al. |
| 6,504,989 B1 | 1/2003 | Gooding |
| 6,511,009 B1 | 1/2003 | Harrison et al. |
| 7,090,509 B1 * | 8/2006 | Gilliland .............. G02B 6/4277 439/76.1 |
| 7,274,852 B1 | 9/2007 | Smrha et al. |
| 8,070,112 B2 | 12/2011 | Smrha et al. |
| 8,737,795 B2 | 5/2014 | Izuhara |
| 9,261,663 B2 | 2/2016 | Loeffelholz et al. |
| 9,291,788 B2 | 3/2016 | Rudenick et al. |
| 9,429,729 B2 | 8/2016 | Burek et al. |
| 9,519,117 B2 | 12/2016 | Macall |
| 9,588,317 B2 | 3/2017 | Bryon et al. |
| 11,105,997 B2 | 8/2021 | Wallace |

(Continued)

FOREIGN PATENT DOCUMENTS

| | | | | |
|---|---|---|---|---|
| CN | 110346881 A | * | 10/2019 | .......... G02B 6/4237 |
| JP | 2012189642 A | | 10/2012 | |

(Continued)

*Primary Examiner* — Daniel Petkovsek
(74) *Attorney, Agent, or Firm* — Harrity & Harrity, LLP

(57) ABSTRACT

An optical fiber holding device may comprise a first track and a second track. The first track may be configured to hold and guide a first optical fiber from a first track input location to a first track output location, wherein the first track is configured to allow the first optical fiber to connect to a first optical component and a first optical communication point. The second track may be configured to hold and guide a second optical fiber from a second track input location to a second track output location, wherein the second track is configured to allow the second optical fiber to connect to a second optical component and a second optical communication point.

20 Claims, 6 Drawing Sheets

(56) References Cited

U.S. PATENT DOCUMENTS

| | | |
|---|---|---|
| 2002/0126978 A1 | 9/2002 | Holman et al. |
| 2011/0026894 A1 | 2/2011 | Rudenick et al. |
| 2013/0243386 A1 | 9/2013 | Pimentel et al. |
| 2014/0161403 A1 | 6/2014 | Milne et al. |
| 2018/0113262 A1* | 4/2018 | Aoki .................... G02B 6/4441 |
| 2018/0129005 A1 | 5/2018 | Smith et al. |
| 2019/0154942 A1* | 5/2019 | Sakurai .................. H05K 1/189 |

FOREIGN PATENT DOCUMENTS

| | | | |
|---|---|---|---|
| JP | 2020046585 A * | 3/2020 | ............... G02B 6/46 |
| WO | 2016201329 A1 | 12/2016 | |

* cited by examiner

OPTICAL FIBER HOLDING DEVICE

RELATED APPLICATION(S)

This application is a divisional of U.S. patent application Ser. No. 16/670,240, filed Oct. 31, 2019 (now U.S. Pat. No. 11,105,997), which claims priority under 35 U.S.C. § 119 to U.S. Provisional Patent Application No. 62/861,174, filed on Jun. 13, 2019, the contents of which are incorporated by reference herein in their entireties.

TECHNICAL FIELD

The present disclosure relates to a device for holding and protecting a plurality of optical fibers inside of a module, and in particular to a device utilizing two tracks to respectively hold and protect two optical fibers inside of an optical transceiver module.

BACKGROUND

Optical transceiver modules are used to transmit and receive optical signals for various high-bandwidth data communications applications. An optical transceiver module may include a transmitter optical sub-assembly (TOSA) for transmitting optical signals and a receiver optical sub-assembly (ROSA) for receiving optical signals.

SUMMARY

According to some implementations, an optical fiber holding device may comprise a hub, a first divider, a second divider, a first support member, a second support member, and a third support member; a first track that includes a first track input location and a first track output location, wherein the first track is configured to hold and guide a first optical fiber from the first track input location around the hub to the first track output location via a plurality of sections of the first track, wherein a section of the first track, of the plurality of sections of the first track, may be defined by one or more respective features of the hub, the first divider, the second divider, the first support member, the second support member, or the third support member; and a second track that includes a second track input location and a second track output location, wherein the second track is configured to hold and guide a second optical fiber from the second track input location around the hub to the second track output location via a plurality of sections of the second track, wherein a section of the second track, of the plurality of sections of the second track, may be defined by the one or more respective features of the hub, the first divider, the second divider, the first support member, the second support member, or the third support member.

According to some implementations, an optical fiber tray may comprise a first track configured to hold and guide a first optical fiber from a first track input location to a first track output location, wherein the first track is configured to allow the first optical fiber to connect to a first optical component and a first optical communication point, wherein the first track has a circular shape, wherein the first track is configured to prevent the first optical fiber from bending tighter than a minimum bending radius of the first optical fiber; and a second track configured to hold and guide a second optical fiber from a second track input location to a second track output location, wherein the second track is configured to allow the second optical fiber to connect to a second optical component and a second optical communication point, wherein the second track has a circular shape, and wherein the second track is configured to prevent the second optical fiber from bending tighter than a minimum bending radius of the second optical fiber.

According to some implementations, an optical transceiver module may comprise a printed circuit board assembly (PCBA); and an optical fiber holding device mounted to the PCBA, the optical fiber holding device comprising: a hub; a first track configured to hold and guide a first optical fiber from a receiver optical sub-assembly (ROSA) optical port around the hub to a ROSA ferrule of a customer interface of a local connector (LC) port; and a second track configured to hold and guide a second optical fiber from a transmitter optical sub-assembly (TOSA) optical port around the hub to a TOSA ferrule of the customer interface of the LC port.

DETAILED DESCRIPTION

Figure 1:
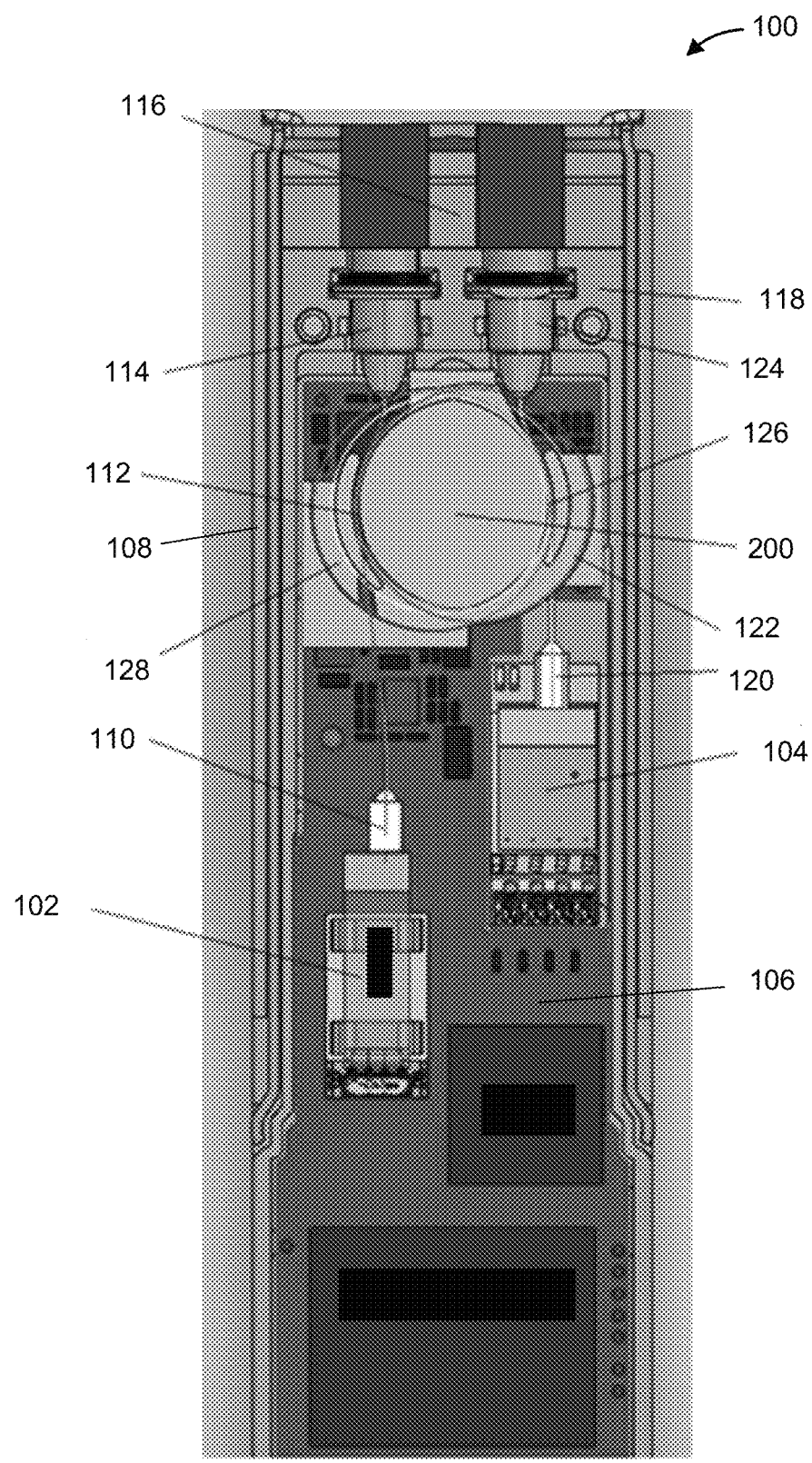
FIG. 1 is a diagram of an example implementation described herein.

The following detailed description of example implementations refers to the accompanying drawings. The same reference numbers in different drawings may identify the same or similar elements.

As mentioned above, an optical transceiver module may include optical components, such as a TOSA and a ROSA, for transmitting and receiving optical signals. Often, the optical components may be directly mounted to a housing of the optical transceiver module and/or a printed circuit board assembly (PCBA) of the optical transceiver module. In many cases, an optical component may be located a distance away from a respective optical communication point of a local connector (LC) port and an optical fiber may be used to connect the optical component to the optical communication point. However, in some cases, due to a limited amount of space in the optical transceiver module, a clear, straight path between the optical component and the optical communication point may not exist, which may cause the optical fiber to become bent, kinked, pinched, stretched, compressed, and/or the like (e.g., during assembly, transport, operation, and/or the like of the optical transceiver module). This may damage the optical fiber, which may inhibit and/or prevent proper functioning of the optical fiber and/or the optical transceiver module. For example, the optical fiber may become snagged on a component of the PCBA and a section of the optical fiber may be bent at an angle that exceeds a maximum bend angle of the optical fiber, which may cause the optical fiber to break or lose some or all of the optical fiber's transmissive ability.

Some implementations described herein provide an optical fiber holding device for protecting one or more optical fibers that run between respective optical components and respective optical communication points. In some implementations, the optical fiber holding device may be contained in an optical transceiver module and placed or mounted on a PCBA of the optical transceiver module. In some implementations, the optical fiber holding device may include a first track for holding and guiding a first optical fiber around a hub of the optical fiber holding device, and may include a second track for holding and guiding a second optical fiber around the hub of the optical fiber. In some implementations, the first track may prevent the first optical fiber from bending tighter than a minimum bending radius of the first optical fiber (e.g., a minimum allowable radius that the first optical fiber may be bent around without damaging the first optical fiber) and/or may prevent the first optical fiber from contacting other components of the PCBA and/or the optical transceiver module that may damage the first optical fiber (e.g., during assembly, transport, operation, and/or the like of the optical transceiver module). Similarly, in some implementations, the second track may prevent the second optical fiber from bending tighter than a minimum bending radius of the second optical fiber (e.g., a minimum allowable radius that the second optical fiber may be bent around without damaging the second optical fiber) and/or may prevent the second optical fiber from contacting other components of the PCBA and/or the optical transceiver module that may damage the second optical fiber (e.g., during assembly, transport, operation, and/or the like of the optical transceiver module).

In this way, the optical fiber holding device may protect optical fibers that run between respective optical components and respective optical communication points in an optical transceiver module. Accordingly, a likelihood that the optical fibers become damaged (e.g., during assembly, transport, operation, and/or the like of the optical transceiver module) is reduced, which increases a likelihood of proper functioning of the optical fibers and/or the optical transceiver module. Moreover, assembling multiple optical transceiver modules with a respective optical fiber holding device may cause respective optical fibers of the multiple optical transceiver modules to be installed in a uniform, protected manner. This may further increase a likelihood of proper functioning of the optical fibers and/or the multiple optical transceiver modules. This may also facilitate faster or more efficient maintenance of the optical transceiver modules.

FIG. 1 is a diagram of an example optical transceiver module 100 described herein. As shown in FIG. 1, the optical transceiver module 100 may include a ROSA 102, a TOSA 104, and a PCBA 106 (e.g., within a housing 108 of the optical transceiver module 100). The ROSA 102 and/or the TOSA 104 may be mounted (or otherwise attached) to the PCBA and/or the housing 108 of the optical transceiver module 100.

A ROSA optical port 110 (e.g., a glass optical fiber stub) may extend from an interface location of the ROSA 102. A first optical fiber 112 may connect the ROSA optical port 110 to a ROSA ferrule 114 of a customer interface 116 of an LC port 118 of the optical transceiver module 100. Similarly, a TOSA optical port 120 (e.g., a glass optical fiber stub) may extend from an interface location of the TOSA 104. A second optical fiber 122 may connect the TOSA optical port 120 to a TOSA ferrule 124 of the customer interface 116 of the LC port 118.

As shown in FIG. 1, the first optical fiber 112 and/or the second optical fiber 122 may respectively wind around a hub of an optical fiber holding device 200. The optical fiber holding device 200 may include a first track 126 that may hold and guide the first optical fiber 112 from the ROSA optical port 110 around the hub of the optical fiber holding device 200 to the ROSA ferrule 114. The first track 126 may be configured to prevent the first optical fiber 112 from bending tighter than a minimum bending radius of the first optical fiber 112 (e.g., a radius of the first track 126 may be greater than or equal to the minimum bending radius of the first optical fiber 112). The minimum bending radius of the first optical fiber 112 may be a minimum allowable radius (e.g., specified by a manufacturer of the first optical fiber) that the first optical fiber 112 may be bent around without damaging the first optical fiber 112. Further, the first track 126 may hold the first optical fiber 112 in place in the first track 126, which may prevent the first optical fiber 112 from being damaged by bending, kinking, pinching, stretching, compressing and/or the like of the first optical fiber 112.

Additionally, or alternatively, the optical fiber holding device 200 may include a second track 128 that may hold and guide the second optical fiber from the TOSA optical port 120 around the hub of the optical fiber holding device 200 to the TOSA ferrule 124. The second track 128 may be configured to prevent the second optical fiber 122 from bending tighter than a minimum bending radius of the second optical fiber 122 (e.g., a radius of the second track 128 may be greater than or equal to the minimum bending radius of the second optical fiber 122). The minimum bending radius of the second optical fiber 122 may be a minimum allowable radius (e.g., specified by a manufacturer of the second optical fiber) that the second optical fiber 122 may be bent around without damaging the second optical fiber 122. Further, the second track 128 may hold the second optical fiber 122 in place in the second track 128, which may prevent the second optical fiber 122 from being damaged by bending, kinking, pinching, stretching, compressing and/or the like of the second optical fiber 122.

The optical fiber holding device 200 may be placed and/or mounted on the PCBA 106 to prevent the first optical fiber 112 and/or the second optical fiber 122 from being damaged by the PCBA 106 (e.g. by one or more components of the PCBA 106, such as resistors, capacitors, and/or the like) and/or the housing 108 (e.g., by one or more components of the housing 108, such as joints, sealing edges, screws or other fasteners, latches, and/or the like) during assembly, transport, operation and/or the like of the optical transceiver module 100. Further description regarding the optical fiber holding device 200 is provided herein in relation to FIGS. 2A-2C.

As indicated above, FIG. 1 is provided merely as one or more examples. Other examples may differ from what is described with regard to FIG. 1.

Figure 2A:
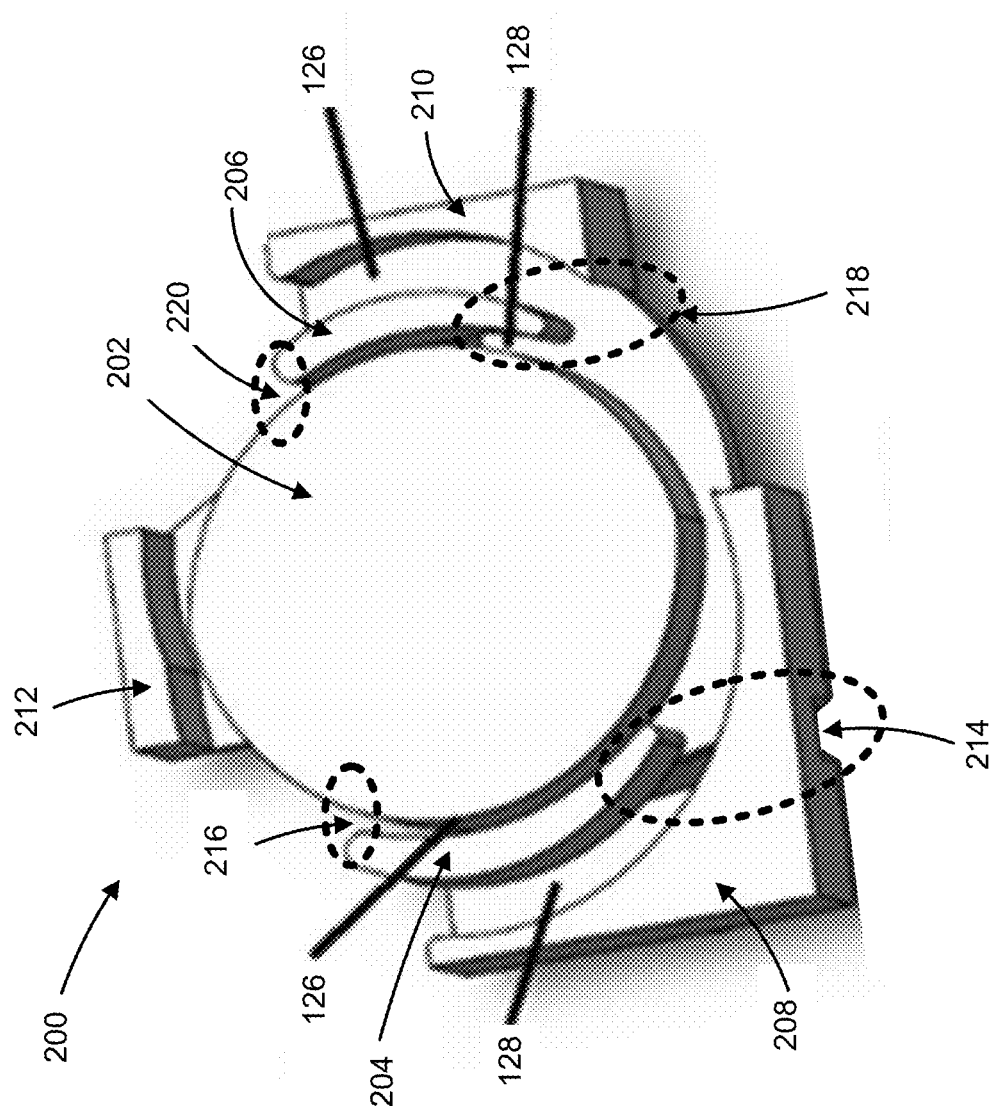
FIGS. 2A-2C are diagrams of an example optical fiber holding device described herein.
Figure 2B:
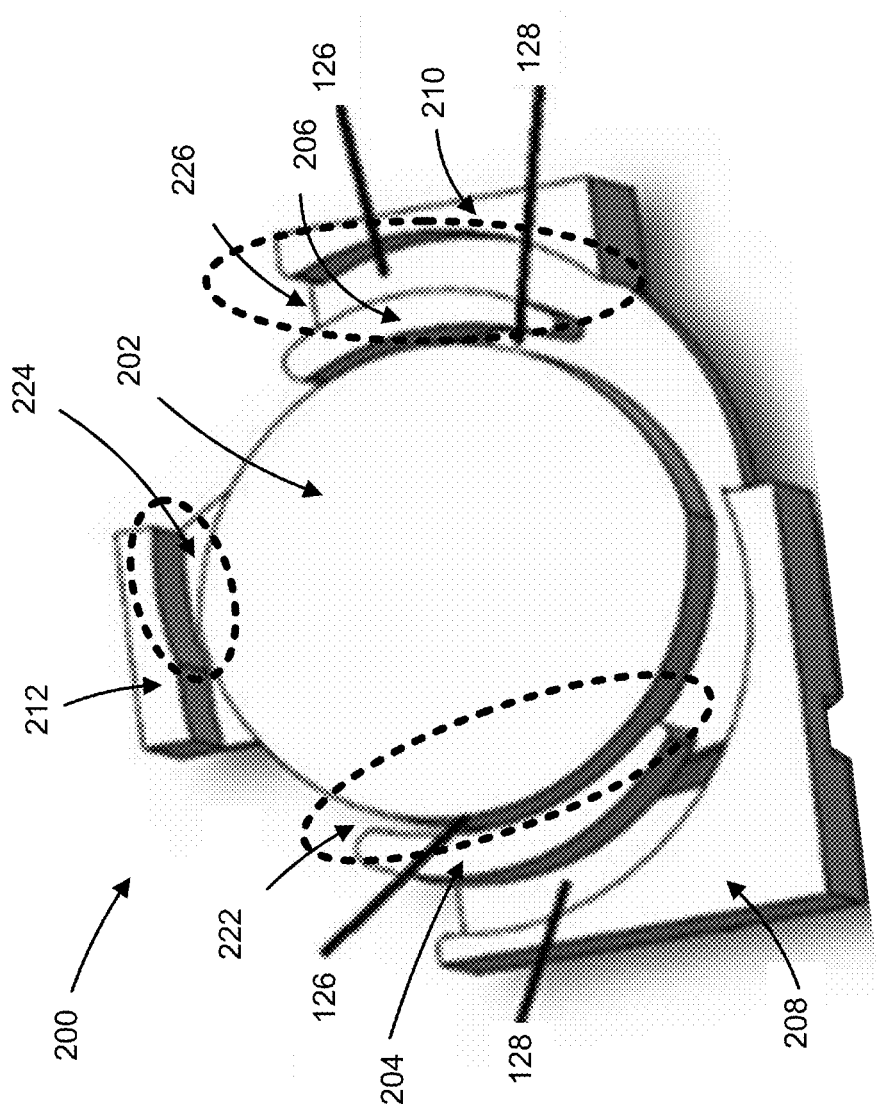
Figure 2C:
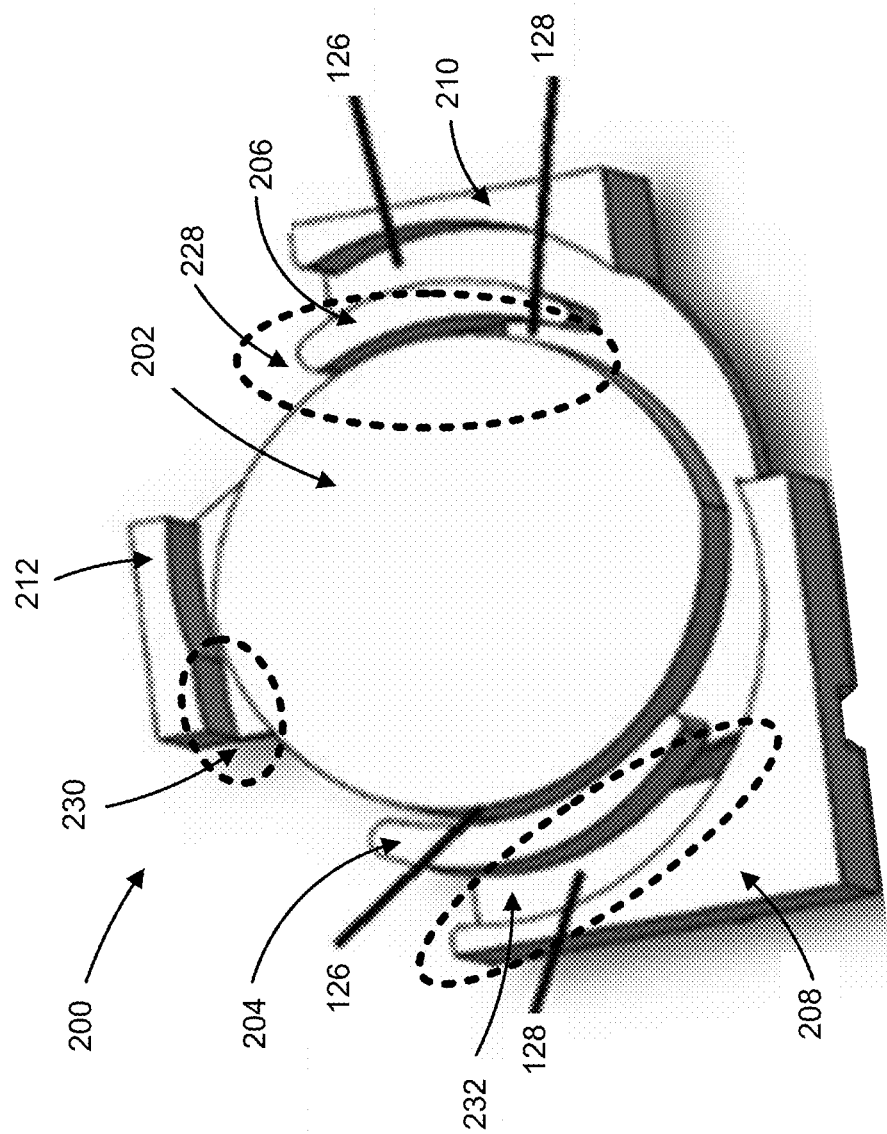

FIGS. 2A-2C are diagrams of an example optical fiber holding device 200 described herein. The optical fiber holding device 200 may be contained in the optical transceiver module 100 (e.g., within the housing 108) as described herein. The optical fiber holding device 200 may be made of plastic, or another insulating material, and may be referred to as a tray (e.g., an optical fiber tray), a spool (e.g., an optical fiber spool), a spindle (e.g., an optical fiber spindle), and/or the like.

The optical fiber holding device 200 may include the first track 126 and/or the second track 128 as described herein. In some implementations, the optical fiber holding device 200 may include one or more surfaces and/or one or more components for providing structure to the optical fiber holding device 200 and/or defining one or more respective sections of the first track 126 and/or the second track 128. For example, the optical fiber holding device 200 may include a hub 202 (e.g., a central portion of the optical fiber holding device 200 around which the first track 126 and/or the second track 128 may circulate), a first divider 204 (e.g., that separates the first track 126 from the second track 128

(e.g., on a left side of the hub 202 as shown in FIG. 2A)), a second divider 206 (e.g., that separates the first track 126 from the second track 128 (e.g., on a right side of the hub 202 as shown in FIG. 2A)), a first structure member 208 (e.g., that provides structure for a portion of the optical fiber holding device 200 (e.g., a lower left portion of the optical fiber holding device 200 as shown in FIG. 2A), a second structure member 210 (e.g., that provides structure for a portion of the optical fiber holding device 200 (e.g., a right portion of the optical fiber holding device 200 as shown in FIG. 2A)), a third structure member 212 (e.g., that provides structure for a portion of the optical fiber holding device 200 (e.g., a top portion of the optical fiber holding device 200 as shown in FIG. 2A)), and/or the like.

As shown in FIG. 2A, the optical fiber holding device 200 may include a first track input location 214 where the first optical fiber 112 may enter the first track 126 and a first track output location 216 where the first optical fiber 112 may exit the first track 126. The first track input location 214 may include an entrance (e.g., a tunnel, a hole, a passthrough, and/or the like) through the first structure member 208 and/or an entrance through the first divider 204. The first track 126 may be configured to hold and guide the first optical fiber 112 from the first track input location 214 around the hub 202 (e.g., in a clockwise direction as shown in FIG. 2A) to the first track output location 216. The first track input location 214 and/or the first track output location 216 may allow the first optical fiber 112 to enter and/or exit the first track 126 at an angle that is less than a maximum bend angle associated with the first optical fiber 112 (e.g., a maximum allowable angle (e.g., specified by a manufacturer of the first optical fiber) that the first optical fiber 112 may be bent without damaging the first optical fiber 112).

Additionally, or alternatively, the second track 128 may include a second track input location 218 where the second optical fiber 122 may enter the second track 128, and a second track output location 220 where the second optical fiber 122 may exit the second track 128. The second track input location 218 may include an entrance (e.g., a tunnel, a hole, a passthrough, and/or the like) through the second structure member 210 and/or an entrance through the second divider 206. The second track 128 may be configured to hold and guide the second optical fiber 122 from the second track input location 218 around the hub 202 (e.g., in a counter-clockwise direction as shown in FIG. 2A) to the second track output location 220. The second track input location 218 and/or the second track output location 220 may allow the second optical fiber 122 to enter and/or exit the second track 128 at an angle that is less than or equal to a maximum bend angle associated with the second optical fiber 122 (e.g., a maximum allowable angle (e.g., specified by a manufacturer of the first optical fiber) that the second optical fiber 122 may be bent without damaging the second optical fiber 122).

As shown in FIG. 2B, the first track 126 may have a circular shape and may include one or more sections. A first section 222 of the first track 126 may be defined by a first sidewall of the first divider 204 (e.g., a right, curved sidewall of the first divider 204 that defines a left, curved sidewall of the first track 126 as shown in FIG. 2B), a portion of a first sidewall of the hub 202 (e.g., a portion of a left, curved sidewall of the hub 202 that defines a right, curved sidewall of the first track 126 as shown in FIG. 2B), and/or a first surface of the optical fiber holding device 200 (e.g., a first top surface of the optical fiber holding device 200 (e.g., that is perpendicular to the right, curved sidewall of the first divider 204 and the portion of the left, curved sidewall of the hub 202) that defines a first bottom surface of the first track 126 as shown in FIG. 2B). A second section 224 of the first track 126 may be defined by a first sidewall of the third structure member 212 (e.g., a bottom right, curved sidewall of the third structure member 212 that defines a top, curved sidewall of the first track 126 as shown in FIG. 2B) and/or a second surface of the optical fiber holding device 200 (e.g., a second top surface of the optical fiber holding device 200 (e.g., that is perpendicular to the bottom right, curved sidewall of the third structure member 212) that defines a second bottom surface of the first track 126 as shown in FIG. 2B). A third section 226 of the first track 126 may be defined by a first sidewall of the second divider 206 (e.g., a right, curved sidewall of the second divider 206 that defines a left, curved sidewall of the first track 126 as shown in FIG. 2B), a sidewall of the second structure member 210 (e.g., a left, curved sidewall of the second structure member 210 that defines a right, curved sidewall of the first track 126 as shown in FIG. 2B), and/or a third surface of the optical fiber holding device 200 (e.g., a third top surface of the optical fiber holding device 200 (e.g., that is perpendicular to the right, curved sidewall of the second divider 206 and the left, curved sidewall of the second structure member 210) that defines a third bottom surface of the first track 126 as shown in FIG. 2B). The one or more sections may facilitate the first track 126 holding and/or guiding the first optical fiber 112 from the first track input location 214 around the hub 202 to the first track output location 216.

As shown in FIG. 2C, the second track 128 may have a circular shape and may include one or more sections. A first section 228 of the second track 128 may be defined by a second sidewall of the second divider 206 (e.g., a left, curved sidewall of the second divider that defines a right, curved sidewall of the second track 128 as shown in FIG. 2C), a portion of a second sidewall of the hub 202 (e.g., a portion of a right, curved sidewall of the hub 202 that defines a left, curved sidewall of the second track 128 as shown in FIG. 2C), and/or a first surface of the optical fiber holding device 200 (e.g., a first top surface of the optical fiber holding device 200 (e.g., that is perpendicular to the left, curved sidewall of the second divider 206 and the portion of the right, curved sidewall of the hub 202) that defines a first bottom surface of the second track 128 as shown in FIG. 2C). A second section 230 of the second track 128 may be defined by a second sidewall of the third structure member 212 (e.g., a bottom left, curved sidewall of the third structure member 212 that defines a top, curved sidewall of the second track 128 as shown in FIG. 2C) and/or a second surface of the optical fiber holding device 200 (e.g., a second top surface of the optical fiber holding device 200 (e.g., that is perpendicular to the bottom left, curved sidewall of the third structure member 212) that defines a second bottom surface of the second track 128 as shown in FIG. 2C). A third section 232 of the second track 128 may be defined by a second sidewall of the first divider 204 (e.g., a left, curved sidewall of the first divider 204 that defines a right, curved sidewall of the second track 128 as shown in FIG. 2C), a sidewall of the first structure member 208 (e.g., a right, curved sidewall of the first structure member 208 that defines a left, curved sidewall of the second track 128 as shown in FIG. 2C), and/or a third surface of the optical fiber holding device 200 (e.g., a third top surface of the optical fiber holding device 200 (e.g., that is perpendicular to the left, curved sidewall of the first divider 204 and the right, curved sidewall of the first structure member 208) that defines a third bottom surface of the second track 128 as shown in FIG. 2C). The one or more sections may facilitate the second track 128 holding and guiding the second optical fiber 122 from the second track input location 218 around the hub 202 to the second track output location 220.

As indicated above, FIGS. 2A-2C are provided merely as one or more examples. Other examples may differ from what is described with regard to FIGS. 2A-2C.

Figure 3:
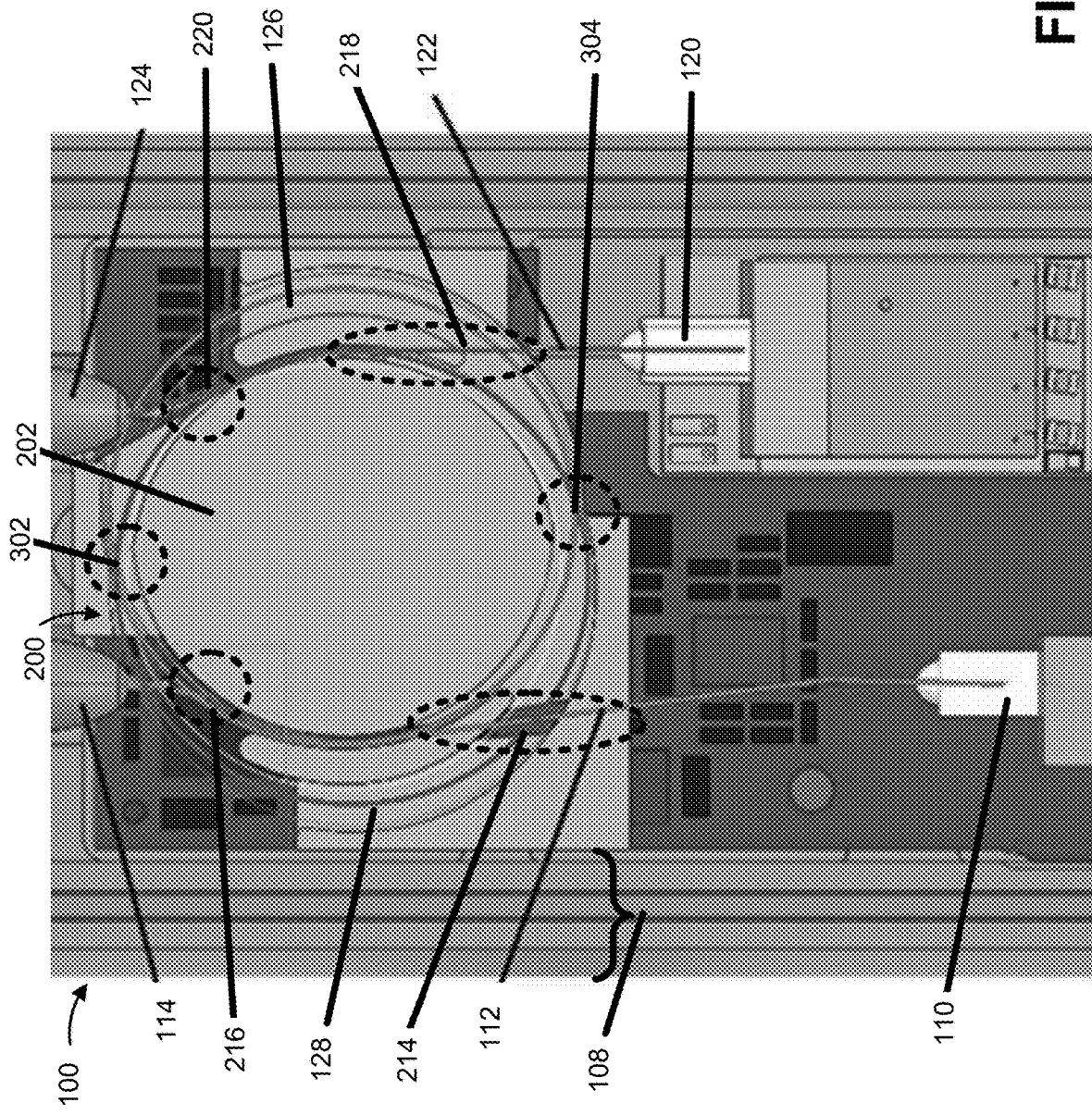
FIG. 3 is a diagram illustrating a top perspective view of an example optical fiber holding device and an example optical transceiver module described herein.

FIG. 3 is a diagram illustrating a top perspective view of an example optical fiber holding device 200 contained within an example optical transceiver module 100 described herein. As shown in FIG. 3, the first track 126 of the optical fiber holding device 200 may hold and guide the first optical fiber 112 from the ROSA optical port 110 (e.g., via the first track input location 214) around the hub 202 to the ROSA ferrule 114 (e.g., via the first track output location 216). The first optical fiber 112 may be of sufficient length to connect to the ROSA optical port 110, wind around the hub 202 one or more times (e.g. via the first track 126), and connect to the ROSA ferrule 114. The first track 126 may have a radius greater than or equal to the minimum bending radius of the first optical fiber 112, which may prevent the first optical fiber 112 from damage when wound around the hub 202.

Further, the first track input location 214 may be aligned with the ROSA optical port 110 such that an entry angle of the first optical fiber 112 entering the first track 126 from the ROSA optical port 110 does not exceed a maximum bend angle associated the first optical fiber 112. Further, the first track output location 216 may be aligned with the ROSA ferrule 114 such that an exit angle of the first optical fiber 112 exiting the first track 126 to the ROSA ferrule 114 does not exceed the maximum bend angle of the first optical fiber 112. In this way, the optical fiber holding device 200 and/or the first track 126 prevent the first optical fiber 112 from being damaged when wound around the hub 202.

As further shown in FIG. 3, the second track 128 of the optical fiber holding device 200 may hold and guide the second optical fiber 122 from the TOSA optical port 120 (e.g., via the second track input location 218) around the hub 202 to the TOSA ferrule 124 (e.g., via the second track output location 220). The second optical fiber 122 may be of sufficient length to connect to the TOSA optical port 120, wind around the hub 202 one or more times (e.g. via the second track 128), and connect to the TOSA ferrule 124. The second track 128 may have a radius greater than or equal to the minimum bending radius of the second optical fiber 122, which may prevent the second optical fiber 122 from being damaged when wound around the hub 202.

Further, the second track input location 218 may be aligned with the TOSA optical port 120 such that an entry angle of the second optical fiber 122 entering the second track 128 from the TOSA optical port 120 does not exceed a maximum bend angle of the second optical fiber 122. Further, the second track output location 220 may be aligned with the TOSA ferrule 124 such that an exit angle of the second optical fiber 122 exiting the second track 128 does not exceed the maximum bend angle of the second optical fiber 122. In this way, the optical fiber holding device 200 and/or the second track 128 prevent the second optical fiber 122 from being damaged.

As shown in FIG. 3, the first track 126 and the second track 128 may both be circular in shape. In some implementations, a center of the first track 126 is not permitted to coincide with a center of the second track 128 (e.g., the first track 126 and the second track are separate and distinct tracks). Accordingly, the first track 126 may overlap the second track 128 at one or more positions. For example, as shown in FIG. 3, the first track 126 may overlap the second track 128 at overlap position 302 and/or overlap position 304. In this way, by preventing the first optical fiber 112 from intermingling with the second optical fiber 122 except at discrete overlapping positions, the first track 126 and the second track 128 may prevent the first optical fiber 112 from tangling with the second optical fiber 122. This may prevent unnecessary pulling, pushing, stretching, compressing, and/or the like of one optical fiber by the other (e.g., during assembly, maintenance, and/or the like of the optical transceiver module 100 when one optical fiber is being wound and/or unwound from the optical fiber holding device 200 and the other optical fiber is to remain wound in the optical fiber holding device 200).

As indicated above, FIG. 3 is provided merely as one or more examples. Other examples may differ from what is described with regard to FIG. 3.

Figure 4:
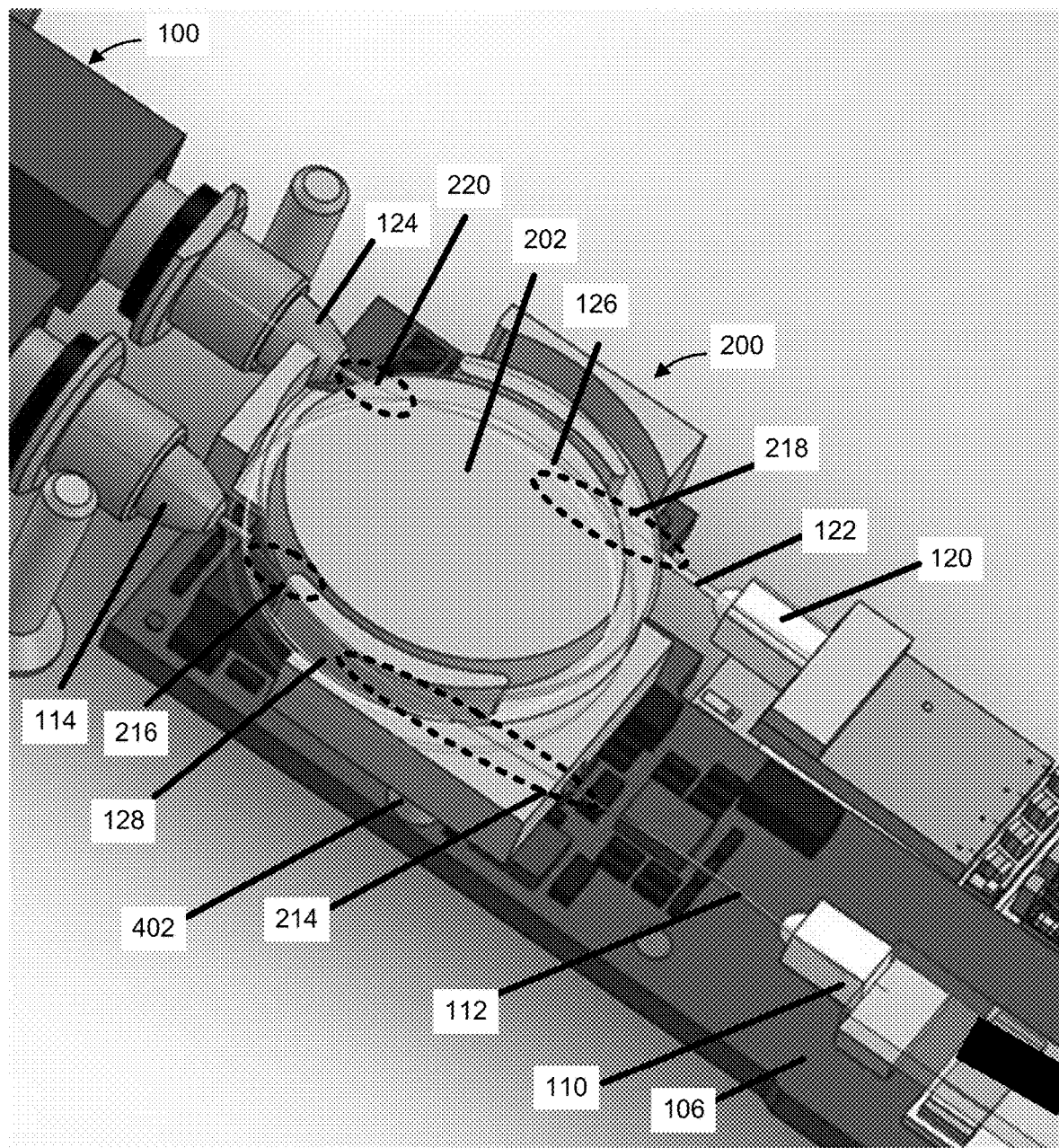
FIG. 4 is a diagram illustrating a side perspective view of an example optical fiber holding device and an example optical transceiver module described herein.

FIG. 4 is a diagram illustrating a side perspective view of an example optical fiber holding device 200 mounted to an example PCBA 106 of an example optical transceiver module 100 described herein. As shown in FIG. 4, the first track 126 of the optical fiber holding device 200 may hold and guide the first optical fiber 112 from the ROSA optical port 110 (e.g., via the first track input location 214) around the hub 202 to the ROSA ferrule 114 (e.g., via the first track output location 216) as described herein. As further shown in FIG. 4, the second track 128 of the optical fiber holding device 200 may hold and guide the second optical fiber 122 from the TOSA optical port 120 (e.g., via the second track input location 218) around the hub 202 to the TOSA ferrule 124 (e.g., via the second track output location 220) as described herein.

As additionally shown in FIG. 4, the optical fiber holding device 200 may be mounted to the PCBA 106 via one or more fasteners 402. Mounting the optical fiber holding device 200 to the PCBA may ensure that a relative position of the optical fiber holding device 200 to the ROSA 102, the TOSA 104, and/or other components of the PCBA 106 remains the same. This may aid in preventing the first optical fiber 112 and/or the second optical fiber 122 from being damaged during assembly, transport, operation, and/or the like of the optical transceiver module 100 (e.g., from vibrations due to jostling, moving, and/or the like of the optical transceiver module 100).

The foregoing disclosure provides illustration and description, but is not intended to be exhaustive or to limit the implementations to the precise forms disclosed. Modifications and variations may be made in light of the above disclosure or may be acquired from practice of the implementations.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical transceiver module comprising:
a printed circuit board assembly (PCBA); and
an optical fiber holding device mounted to the PCBA, the optical fiber holding device comprising:
a hub;
a first divider;
a second divider;
a first track configured to hold and guide a first optical fiber from a receiver optical sub-assembly (ROSA) optical port around the hub and the first divider to a ROSA ferrule of a customer interface of a local connector (LC) port; and
a second track configured to hold and guide a second optical fiber from a transmitter optical sub-assembly (TOSA) optical port around the hub and the second divider to a TOSA ferrule of the customer interface of the LC port,
wherein the first track and the second track are offset from a center of the hub and offset from one another.

2. The optical transceiver module of claim 1, wherein the first track has a circular shape and a radius of the first track is greater than or equal to a minimum bending radius of the first optical fiber.

3. The optical transceiver module of claim 1, wherein the second track is configured to hold the second optical fiber in place in the second track to prevent bending, kinking, pinching, stretching, or compressing of the second optical fiber.

4. The optical transceiver module of claim 1, wherein the optical fiber holding device is configured to prevent the first optical fiber and the second optical fiber from being damaged by one or more components of the PCBA.

5. The optical transceiver module of claim 1, wherein a first track input location of the first track is aligned with the ROSA optical port and a first track output location of the first track is aligned with the ROSA ferrule.

6. The optical transceiver module of claim 1, wherein the first track is configured to hold and guide the first optical fiber from the ROSA optical port around the hub to the ROSA ferrule via a plurality of sections of the first track.

7. The optical transceiver module of claim 6, wherein a section of the first track, of the plurality of sections of the first track, is defined by one or more respective features of the hub, the first divider, the second divider, a first support member, a second support member, or a third support member.

8. An optical fiber holding device, comprising:
a hub;
a first divider;
a second divider;
a first track configured to hold and guide a first optical fiber from a receiver optical sub-assembly (ROSA) optical port around the hub and the first divider to a ROSA ferrule of a customer interface of a local connector (LC) port; and
a second track configured to hold and guide a second optical fiber from a transmitter optical sub-assembly (TOSA) optical port around the hub and the second divider to a TOSA ferrule of the customer interface of the LC port,
wherein the first track and the second track are offset from a center of the hub and offset from one another.

9. The optical fiber holding device of claim 8, wherein the first track has a circular shape and a radius of the first track is greater than or equal to a minimum bending radius of the first optical fiber.

10. The optical fiber holding device of claim 8, wherein the second track is configured to hold the second optical fiber in place in the second track to prevent bending, kinking, pinching, stretching, or compressing of the second optical fiber.

11. The optical fiber holding device of claim 8, wherein the optical fiber holding device is configured to prevent the first optical fiber and the second optical fiber from being damaged by one or more components of a printed circuit board assembly (PCBA).

12. The optical fiber holding device of claim 8, wherein a first track input location of the first track is aligned with the ROSA optical port and a first track output location of the first track is aligned with the ROSA ferrule.

13. The optical fiber holding device of claim 8, wherein the first track is configured to hold and guide the first optical fiber from the ROSA optical port around the hub to the ROSA ferrule via a plurality of sections of the first track.

14. The optical fiber holding device of claim 13, wherein a section of the first track, of the plurality of sections of the first track, is defined by one or more respective features of the hub, the first divider, the second divider, a first support member, a second support member, or a third support member.

15. An optical fiber tray, comprising:
a hub;
a first divider;
a second divider;
a first track configured to hold and guide a first optical fiber from a receiver optical sub-assembly (ROSA) optical port around the hub and the first divider to a ROSA ferrule of a customer interface of a local connector (LC) port; and
a second track configured to hold and guide a second optical fiber from a transmitter optical sub-assembly (TOSA) optical port around the hub and the second divider to a TOSA ferrule of the customer interface of the LC port,
wherein the first track and the second track are offset from a center of the hub and offset from one another.

16. The optical fiber tray of claim 15, wherein the first track has a circular shape and a radius of the first track is greater than or equal to a minimum bending radius of the first optical fiber.

17. The optical fiber tray of claim 15, wherein the second track is configured to hold the second optical fiber in place in the second track to prevent bending, kinking, pinching, stretching, or compressing of the second optical fiber.

18. The optical fiber tray of claim 15, wherein the optical fiber tray is configured to prevent the first optical fiber and the second optical fiber from being damaged by one or more components of a printed circuit board assembly (PCBA).

19. The optical fiber tray of claim 15, wherein a first track input location of the first track is aligned with the ROSA optical port and a first track output location of the first track is aligned with the ROSA ferrule.

20. The optical fiber tray of claim 15, wherein the first track is configured to hold and guide the first optical fiber from the ROSA optical port around the hub to the ROSA ferrule via a plurality of sections of the first track.

* * * * *